Sept. 2, 1930.    C. T. SMITH    1,774,767
COSMETIC CONTAINER
Filed May 31, 1929
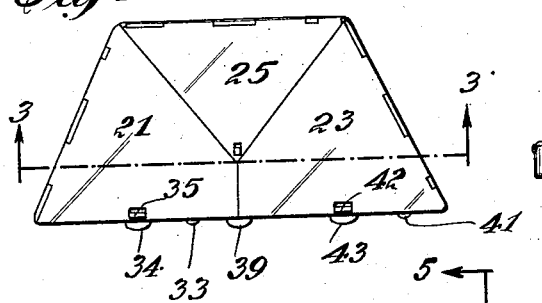
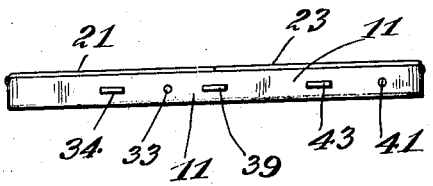
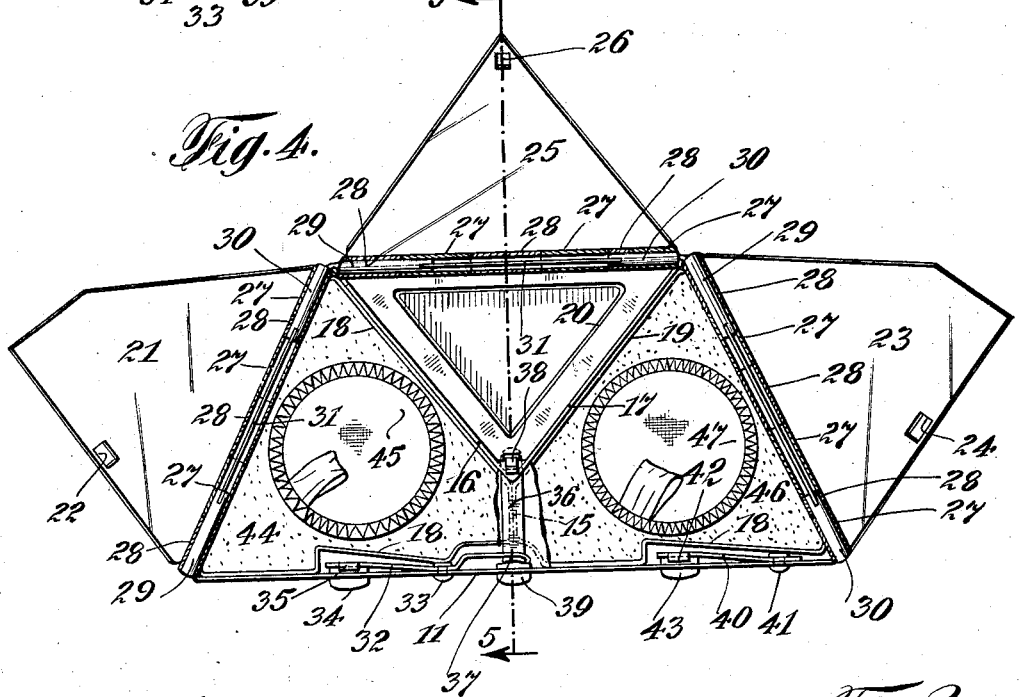
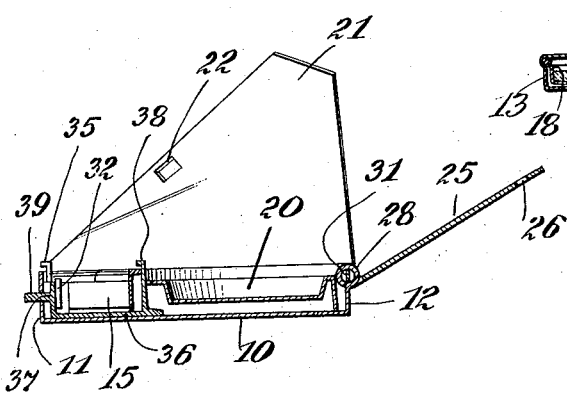
INVENTOR
Clinton T. Smith
BY
his ATTORNEY Patented Sept. 2, 1930

1,774,767

UNITED STATES PATENT OFFICE

CLINTON T. SMITH, OF ATTLEBORO, MASSACHUSETTS, ASSIGNOR TO FILLWIK COMPANY, OF ATTLEBORO, MASSACHUSETTS

COSMETIC CONTAINER

Application filed May 31, 1929. Serial No. 367,361.

My invention relates to containers and refers particularly to devices of the character described adapted for use with cosmetics and toilet preparations.

Among the desirable properties of containers of this character are compactness, attractiveness, novelty, ease of access to the contents, ability to carry more than one commodity and possibility of obtaining access to any desired compartment without disturbing or exposing, other commodities contained therein.

All of the above, and other, desirable attributes are possessed by the device of my invention as will be evident upon a consideration of my specification and its accompanying drawings.

In the accompanying drawings illustrating one form of the device of my invention, similar parts are designated by similar numerals.

Figure 1 is a top view of one form of my device in closed position.

Figure 2 is a front view of Figure 1.

Figure 3 is a section through the line 3—3 of Figure 1.

Figure 4 is a top view of the device of Figure 1 with all compartments open.

Figure 5 is a section through the line 5—5 of Figure 4.

The particular form of the device of my invention illustrated in the accompanying drawings comprises a casing having the bottom 10, the front 11, the back 12 and the ends 13 and 14.

Within the casing and fixedly attached to the bottom 10 thereof is a Y-shaped partition having the hollow arm 15 and the two plate arms 16 and 17, thus dividing the casing into three triangular compartments.

Removable trays 18, 19 and 20 are positioned within the three triangular compartments of the casing.

A cover 21, having an opening 22, is hingedly attached to the end 13. A cover 23, having an opening 24, is hingedly attached to the end 14. A cover 25, having an opening 26, is hingedly attached to the back 12. I prefer to have the inner face of the covers of a reflecting material, or metal, in order that they may act as mirrors.

Each of the covers 21, 23 and 25 is spring controlled as follows: The tubular portions 27, 27, 27 are turned over portions of a cover, while the tubular portions 28, 28, 28 are turned over portions of the back 12. During the movement of the cover, therefore, the portions 28, 28, 28 are stationary, while the portions 27, 27, 27 revolve. Within the hinge is a cylindrical member 29, fixedly attached to the end tubular member 28 and having a slit in the end thereof. The member 29 is stationary and does not revolve when the lid is moved. The other end of the hinge contains a cylindrical member 30 fixedly attached to the member 28, having a slit in the end thereof. This member 30, therefore, revolves when the cover is moved.

A flat resilient spring 31 is positioned within the slits of the members 29 and 30, the spring 31 being in normal unflexed position when the cover is open. When the cover is closed, however, the spring is in a twisted position, thus tending to move the cover into open position.

A resilient flat spring 32, fixedly attached at 33 to the casing front 11 has a thumb push member 34 extending through an opening in the front 11 and an upwardly extended hook-catch 35 capable of insertion through the opening 22 of the lid 21 retaining the lid in closed position.

A flat catch member 36 has an upturned member 37, positioned between the spring 32 and the front 11 of the casing, an upwardly extended hook-catch 38 capable of insertion through the opening 26 of the cover 25, retaining it in closed position and a thumb-push 39 extending through an opening in the casing front 11.

A resilient flat spring 40, fixedly attached at 41 to the casing front 11, has the upwardly extended hook-catch 42, capable of insertion through the opening 24 of the cover 23, retaining the cover in closed position and a thumb-push 43 extending through an opening in the casing front 11.

A powder compact 44 and a puff 45 are placed in compartment tray 18, a powder compact 46 and a puff 47 are placed in compartment tray 19 and rouge can be placed in compartment tray 20.

It will thus be seen that my device comprises an attractive casing, within which is a plurality of covered compartments, each of which may be opened independently of the others, each cover acting as a mirror when access is had to its contents.

It will be further noted that if the exterior faces of the cover be given different colors, or designs, a most attractive appearance will be imparted to my device.

I do not limit myself to the particular size, shape, number, or arrangement of parts as shown and described as these are given simply as a means for clearly describing the device of my invention.

What I claim is:—

1. In a cosmetic container, in combination, a casing, a Y-shaped partition within said casing forming a plurality of compartments therein, a hinged cover for each compartment, means for retaining each cover in closed position and exteriorly operative means for releasing each cover from retained closed position.

2. In a cosmetic container, in combination, a casing, a Y-shaped partition within said casing forming a plurality of compartments therein, a spring-operated cover for each compartment hingedly attached to a side of said casing and having a reflecting inner face, means for retaining each cover in closed position and exteriorly operative means for releasing each cover from retained closed position.

3. In a cosmetic container, in combination, a four-sided casing, a Y-shaped partition within said casing forming a plurality of compartments therein, a hinged cover for each compartment means for retaining each cover in closed position and exteriorly operative means for releasing each cover from retained closed position.

4. In a cosmetic container, in combination, a four-sided casing, an angular partition within said casing forming a plurality of compartments therein, a spring-operated cover for each compartment hingedly attached to a side of said casing and having a reflecting inner face, means for retaining each cover in closed position and exteriorly operative means for releasing each cover from retained closed position.

5. In a cosmetic container, in combination, a trapezoid casing; a Y-shaped partition within said casing, the base member of said partition being perpendicular to one side of said casing and the arms of said partition being extended into opposite angles of said casing, thus forming three compartments; a hinged cover for each compartment; means for retaining each cover in closed position, and exteriorly operative means for releasing each cover from retained closed position.

6. In a cosmetic container, in combination, a trapezoid casing; a Y-shaped partition within said casing, the base member of said partition being perpendicular to one side of said casing and the arms of said partition being extended into opposite angles of said casing, thus forming three compartments; a spring-operated hinged cover for each compartment; means for retaining each cover in closed position, and exteriorly operative means for releasing each cover from retained closed position.

Signed at Attleboro, in the county of Bristol and State of Massachusetts, this 22nd day of May, 1929.

CLINTON T. SMITH.